United States Patent
Bendre et al.

(10) Patent No.: US 11,841,856 B2
(45) Date of Patent: Dec. 12, 2023

(54) SYSTEM, METHOD, AND COMPUTER PROGRAM PRODUCT FOR EFFICIENTLY JOINING TIME-SERIES DATA TABLES

(71) Applicant: Visa International Service Association, San Francisco, CA (US)

(72) Inventors: Mangesh Bendre, Sunnyvale, CA (US); Robert Brian Christensen, Saratoga Springs, UT (US); Yan Zheng, Los Gatos, CA (US); Wei Zhang, Fremont, CA (US); Fei Wang, Fremont, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/907,996

(22) PCT Filed: Mar. 24, 2022

(86) PCT No.: PCT/US2022/021623
§ 371 (c)(1),
(2) Date: Aug. 30, 2022

(65) Prior Publication Data
US 2023/0306024 A1   Sep. 28, 2023

(51) Int. Cl.
*G06F 16/00* (2019.01)
*G06F 16/2453* (2019.01)
(Continued)

(52) U.S. Cl.
CPC .......... *G06F 16/24537* (2019.01); *G06F 7/08* (2013.01); *G06F 16/2477* (2019.01); *G06F 16/27* (2019.01)

(58) Field of Classification Search
CPC .. G06F 16/24537; G06F 7/08; G06F 16/2477; G06F 16/27
See application file for complete search history.

(56) References Cited

U.S. PATENT DOCUMENTS

| 5,117,495 A | 5/1992 | Liu |
| 10,185,743 B2 | 1/2019 | Sundarrajan et al. |

(Continued)

FOREIGN PATENT DOCUMENTS

| CN | 108170535 A | 6/2018 |
| EP | 2767913 A1 | 8/2014 |

(Continued)

OTHER PUBLICATIONS

Lämmel et al., "MapReduce with Deltas", May 18, 2011, retrieved from (https://userpages.uni-koblenz.de/~softlang/deltamr/paper.pdf, 7 pages.

*Primary Examiner* — Alexander Khong
(74) *Attorney, Agent, or Firm* — THE WEBB LAW FIRM

(57) ABSTRACT

Described are a system, method, and computer program product for efficiently joining time-series data tables. The method includes loading a first table and a second table into a memory and generating a set of first key-value pairs based on a set of first time-series records and a set of second key-value pairs based on a set of second time-series records. The method also includes sorting the set of first key-value pairs and the set of second key-value pairs. The method further includes interleaving the set of first key-value pairs with the set of second key-value pairs and sequentially matching the sets of time-series records to form a joined table. The method further includes, in response to matching each respective second time-series record with the respective first time-series record, removing the respective second time-series record from the at least one memory.

20 Claims, 8 Drawing Sheets

(51) Int. Cl.
*G06F 16/27* (2019.01)
*G06F 16/2458* (2019.01)
*G06F 7/08* (2006.01)

(56) References Cited

U.S. PATENT DOCUMENTS

| | | |
|---|---|---|
| 2003/0088542 A1 | 5/2003 | McGee et al. |
| 2011/0161558 A1 | 6/2011 | Callen |
| 2011/0320451 A1 | 12/2011 | Boh et al. |
| 2014/0089270 A1 | 3/2014 | Shaft et al. |
| 2016/0127465 A1* | 5/2016 | Barstow ................ G06F 16/273 707/620 |
| 2020/0068014 A1* | 2/2020 | Sarkar ..................... G06F 16/27 |
| 2020/0143795 A1* | 5/2020 | Park ........................ G10L 25/63 |
| 2021/0365344 A1* | 11/2021 | Bui ......................... G06F 11/34 |
| 2022/0342861 A1* | 10/2022 | Gonzalez Macias ....................... G06F 16/215 |

FOREIGN PATENT DOCUMENTS

| | | | |
|---|---|---|---|
| IN | 2014MU00989 A | | 3/2014 |
| JP | 2002063348 A | * | 2/2002 |

* cited by examiner

SYSTEM, METHOD, AND COMPUTER PROGRAM PRODUCT FOR EFFICIENTLY JOINING TIME-SERIES DATA TABLES

CROSS-REFERENCE TO RELATED APPLICATION

This application is the United States national phase of International Application No. PCT/US2022/021623 filed Mar. 24, 2022, the entire disclosure of which is hereby incorporated by reference in its entirety.

BACKGROUND

1. Technical Field

This disclosure relates generally to joining and merging datasets and, in non-limiting embodiments or aspects, to systems, methods, and computer program products for efficiently joining time-series data tables.

2. Technical Considerations

Large tables of data may need to be joined together (e.g., fuzzily joined) to allow for combined analysis and to provide for more meaningful insights than from one data table alone. Joining large tables may involve identifying a primary key column and matching up records (e.g., rows) of two data tables based on matching values of a column and rules for a fuzzy join. For example, transaction processing systems in electronic payment processing networks may need to join datasets of payment authorization and settlement data by use of multiple fuzzy rules (e.g., matching payment authorization and settlement records even if there is a 10% deviation in transaction amount) in addition to an account number. For large data tables (e.g., with millions of records), the joining process may be computationally slow and resource intensive. A join operation where one or both tables are large may take time on the scale of hours, days, or longer.

The computational inefficiency of joining large data tables may be particularly acute when such large data tables are populated continually, e.g., constantly receiving new data over a period of hours, days, etc. This type of data may also be sortable by time (e.g., time-series records) as it is continually produced. For example, transaction processing systems in electronic payment processing networks may receive and generate large volumes of transaction data every second, such as for the purposes of authorization and settlement of payment transactions. If a transaction service provider desired to join such large data tables for analytic purposes, and if said join took a long time to execute (e.g., processing records slower than the rate of new data being generated, joining in a time interval longer than an interval for data collection, etc.), then it may be difficult to obtain meaningful insights from such a join in a timely manner.

Computational inefficiencies may also be exacerbated if the number of records for a specific value in the join column varies substantially. For example, in an electronic payment processing network, some merchants may have a few hundred transactions in a month, while others may have more than millions. This situation is also referred to as data skew. Use of multiple processors to join tables of unequal size may lead to certain processors executing a large portion of the join process, while other processors are executing a small portion of the join process. As such, only some of the join process is effectively in parallel, and the overall computation time may be undesirably extended until the overloaded processor finishes processing its larger portion.

Accordingly, there is a need in the art for a technical solution that provides for efficient fuzzy and non-fuzzy joining of data tables, including large data tables, time-series data tables, and/or skewed data tables of unequal size. There is a need to reduce the overall computation time in joining such data tables to improve the functioning of a computer system that relies on such joined data tables.

SUMMARY

According to some non-limiting embodiments or aspects, provided are systems, methods, and computer program products for efficiently joining time-series data tables that overcome some or all of the deficiencies identified above.

According to some non-limiting embodiments or aspects, provided is a computer-implemented method for efficiently joining time-series data tables. The method includes loading, with at least one processor, a first table and a second table into at least one memory, the first table including a set of first time-series records and the second table including a set of second time-series records, each first time-series record of the set of first time-series records including a first plurality of attributes, and each second time-series record of the set of second time-series records including a second plurality of attributes, wherein a first attribute of the first plurality of attributes is of a target type and a second attribute of the second plurality of attributes is of the target type, and wherein the first plurality of attributes further includes a respective first time stamp of each first time-series record and the second plurality of attributes further includes a respective second time stamp of each second time-series record. The method further includes generating, with at least one processor, a set of first key-value pairs based on the set of first time-series records of the first table and a set of second key-value pairs based on the set of second time-series records of the second table, wherein each first key-value pair of the set of first key-value pairs includes, for each first time-series record, a first key based on the first attribute and a first value based on at least one first other attribute of the first plurality of attributes, and wherein each second key-value pair of the set of second key-value pairs includes, for each second time-series record, a second key based on the second attribute and a second value based on at least one second other attribute of the second plurality of attributes. The method further includes sorting, with at least one processor, the set of first key-value pairs based on the first key and the respective first time stamp of each first time-series record. The method further includes sorting, with at least one processor, the set of second key-value pairs based on the second key and the respective second time stamp of each second time-series record. The method further includes interleaving, with at least one processor, the set of first key-value pairs with the set of second key-value pairs based on the respective first time stamp of each first time-series record and the respective second time stamp of each second time-series record. The method further includes sequentially matching, with at least one processor, each respective second time-series record with a respective first time-series record based on the second key, the respective second time stamp, the first key, and the respective first time stamp, to form a respective joined record in a joined table. The method further includes, in response to matching each respective second time-series record with the respective first time-series record, removing, with at least one processor, the respective second time-series record from the at least one memory.

In some non-limiting embodiments or aspects, the matching of each respective second time-series record with a respective first time-series record may be carried out on one of a plurality of server nodes, and each node of the plurality of server nodes may execute an independent mapper to match a different subset of first time-series records of the set of first time-series records in parallel with each other node of the plurality of server nodes.

In some non-limiting embodiments or aspects, at least one of the first table and the second table may be skewed. The method may further include replicating, with at least one processor and before generating the set of first key-value pairs, each first time-series record of the set of first time-series records a predetermined number of times to yield a plurality of identical records for said each first time-series record, thereby increasing a size of the set of first time-series records in proportion to the predetermined number. The matching of each respective second time-series record with a respective first time-series record may further include randomly matching said each respective second time-series record with one time-series record of the plurality of identical records for said respective first time-series record.

In some non-limiting embodiments or aspects, the predetermined number of times each first time-series record is replicated may be at least ten. A number of the plurality of identical records may be a same number as the plurality of server nodes. Each identical record of the plurality of identical records may be sent to a different mapper of the plurality of server nodes. The randomly matching of said each respective second time-series record further may include randomly selecting a mapper of the plurality of server nodes.

In some non-limiting embodiments or aspects, the set of first time-series records may include a plurality of transaction authorization records processed by a transaction processing system. The set of second time-series records may include a plurality of transaction settlement records processed by the transaction processing system.

In some non-limiting embodiments or aspects, the removing of each respective second time-series record from the at least one memory may occur in real-time immediately after said each respective second time-series record is matched with the respective first time-series record.

According to some non-limiting embodiments or aspects, provided is a system for efficiently joining time-series data tables. The system includes at least one server including at least one processor. The at least one server is programmed or configured to load a first table and a second table into at least one memory, the first table including a set of first time-series records and the second table including a set of second time-series records, each first time-series record of the set of first time-series records including a first plurality of attributes, and each second time-series record of the set of second time-series records including a second plurality of attributes, wherein a first attribute of the first plurality of attributes is of a target type and a second attribute of the second plurality of attributes is of the target type, and wherein the first plurality of attributes further includes a respective first time stamp of each first time-series record and the second plurality of attributes further includes a respective second time stamp of each second time-series record. The at least one server is programmed or configured to generate a set of first key-value pairs based on the set of first time-series records of the first table and a set of second key-value pairs based on the set of second time-series records of the second table, wherein each first key-value pair of the set of first key-value pairs includes, for each first time-series record, a first key based on the first attribute and a first value based on at least one first other attribute of the first plurality of attributes, and wherein each second key-value pair of the set of second key-value pairs includes, for each second time-series record, a second key based on the second attribute and a second value based on at least one second other attribute of the second plurality of attributes. The at least one server is programmed or configured to sort the set of first key-value pairs based on the first key and the respective first time stamp of each first time-series record. The at least one server is programmed or configured to sort the set of second key-value pairs based on the second key and the respective second time stamp of each second time-series record. The at least one server is programmed or configured to interleave the set of first key-value pairs with the set of second key-value pairs based on the respective first time stamp of each first time-series record and the respective second time stamp of each second time-series record. The at least one server is programmed or configured to sequentially match each respective second time-series record with a respective first time-series record based on the second key, the respective second time stamp, the first key, and the respective first time stamp, to form a respective joined record in a joined table. The at least one server is programmed or configured to, in response to matching each respective second time-series record with the respective first time-series record, remove the respective second time-series record from the at least one memory.

In some non-limiting embodiments or aspects, the at least one server may include a plurality of server nodes. Matching each respective second time-series record with a respective first time-series record may be carried out on one of the plurality of server nodes. Each node of the plurality of server nodes may execute an independent mapper to match a different subset of first time-series records of the set of first time-series records in parallel with each other node of the plurality of server nodes.

In some non-limiting embodiments or aspects, at least one of the first table and the second table may be skewed. The at least one server may be further programmed or configured to replicate, before generating the set of first key-value pairs, each first time-series record of the set of first time-series records a predetermined number of times to yield a plurality of identical records for said each first time-series record, thereby increasing a size of the set of first time-series records in proportion to the predetermined number. Matching each respective second time-series record with a respective first time-series record may further include randomly matching said each respective second time-series record with one time-series record of the plurality of identical records for said respective first time-series record.

In some non-limiting embodiments or aspects, the predetermined number of times each first time-series record is replicated may be at least ten. A number of the plurality of identical records may be a same number as the plurality of server nodes. Each identical record of the plurality of identical records may be sent to a different mapper of the plurality of server nodes. The randomly matching of said each respective second time-series record may further include randomly selecting a mapper of the plurality of server nodes.

In some non-limiting embodiments or aspects, the at least one server may be a part of a transaction processing system. The set of first time-series records may include a plurality of transaction authorization records processed by the transaction processing system. The set of second time-series records may include a plurality of transaction settlement records processed by the transaction processing system.

In some non-limiting embodiments or aspects, removing each respective second time-series record from the at least one memory may occur in real-time immediately after said each respective second time-series record is matched with the respective first time-series record.

According to some non-limiting embodiments or aspects, provided is a computer program product for efficiently joining time-series data tables. The computer program product includes at least one non-transitory computer-readable medium including program instructions that, when executed by at least one processor, cause the at least one processor to load a first table and a second table into at least one memory, the first table including a set of first time-series records and the second table including a set of second time-series records, each first time-series record of the set of first time-series records including a first plurality of attributes, and each second time-series record of the set of second time-series records including a second plurality of attributes, wherein a first attribute of the first plurality of attributes is of a target type and a second attribute of the second plurality of attributes is of the target type, and wherein the first plurality of attributes further includes a respective first time stamp of each first time-series record and the second plurality of attributes further includes a respective second time stamp of each second time-series record. The program instructions further cause the at least one processor to generate a set of first key-value pairs based on the set of first time-series records of the first table and a set of second key-value pairs based on the set of second time-series records of the second table, wherein each first key-value pair of the set of first key-value pairs includes, for each first time-series record, a first key based on the first attribute and a first value based on at least one first other attribute of the first plurality of attributes, and wherein each second key-value pair of the set of second key-value pairs includes, for each second time-series record, a second key based on the second attribute and a second value based on at least one second other attribute of the second plurality of attributes. The program instructions further cause the at least one processor to sort the set of first key-value pairs based on the first key and the respective first time stamp of each first time-series record. The program instructions further cause the at least one processor to sort the set of second key-value pairs based on the second key and the respective second time stamp of each second time-series record. The program instructions further cause the at least one processor to interleave the set of first key-value pairs with the set of second key-value pairs based on the respective first time stamp of each first time-series record and the respective second time stamp of each second time-series record. The program instructions further cause the at least one processor to sequentially match each respective second time-series record with a respective first time-series record based on the second key, the respective second time stamp, the first key, and the respective first time stamp, to form a respective joined record in a joined table. The program instructions further cause the at least one processor to, in response to matching each respective second time-series record with the respective first time-series record, remove the respective second time-series record from the at least one memory.

In some non-limiting embodiments or aspects, the at least one processor may include a plurality of server nodes. Matching each respective second time-series record with a respective first time-series record may be carried out on one of the plurality of server nodes. Each node of the plurality of server nodes may execute an independent mapper to match a different subset of first time-series records of the set of first time-series records in parallel with each other node of the plurality of server nodes.

In some non-limiting embodiments or aspects, at least one of the first table and the second table may be skewed. The program instructions may further cause the at least one processor to replicate, before generating the set of first key-value pairs, each first time-series record of the set of first time-series records a predetermined number of times to yield a plurality of identical records for said each first time-series record, thereby increasing a size of the set of first time-series records in proportion to the predetermined number. Matching each respective second time-series record with a respective first time-series record may further include randomly matching said each respective second time-series record with one time-series record of the plurality of identical records for said respective first time-series record.

In some non-limiting embodiments or aspects, the predetermined number of times each first time-series record is replicated may be at least ten. A number of the plurality of identical records may be a same number as the plurality of server nodes. Each identical record of the plurality of identical records may be sent to a different mapper of the plurality of server nodes. The randomly matching of said each respective second time-series record may further include randomly selecting a mapper of the plurality of server nodes.

In some non-limiting embodiments or aspects, removing each respective second time-series record from the at least one memory may occur in real-time immediately after said each respective second time-series record is matched with the respective first time-series record.

Other non-limiting embodiments or aspects will be set forth in the following numbered clauses:

Clause 1: A computer-implemented method comprising: loading, with at least one processor, a first table and a second table into at least one memory, the first table comprising a set of first time-series records and the second table comprising a set of second time-series records, each first time-series record of the set of first time-series records comprising a first plurality of attributes, and each second time-series record of the set of second time-series records comprising a second plurality of attributes, wherein a first attribute of the first plurality of attributes is of a target type and a second attribute of the second plurality of attributes is of the target type, and wherein the first plurality of attributes further comprises a respective first time stamp of each first time-series record and the second plurality of attributes further comprises a respective second time stamp of each second time-series record; generating, with at least one processor, a set of first key-value pairs based on the set of first time-series records of the first table and a set of second key-value pairs based on the set of second time-series records of the second table, wherein each first key-value pair of the set of first key-value pairs comprises, for each first time-series record, a first key based on the first attribute and a first value based on at least one first other attribute of the first plurality of attributes, and wherein each second key-value pair of the set of second key-value pairs comprises, for each second time-series record, a second key based on the second attribute and a second value based on at least one second other attribute of the second plurality of attributes; sorting, with at least one processor, the set of first key-value pairs based on the first key and the respective first time stamp of each first time-series record; sorting, with at least one processor, the set of second key-value pairs based on the second key and the respective second time stamp of each second time-series record; interleaving, with at least one processor, the set of first key-value pairs with the set of second key-value pairs based on the respective first time stamp of each first time-series record and the respective second time stamp of each second time-series record; sequentially matching, with at least one processor, each respective second time-series record with a respective first time-series record based on the second key, the respective second time stamp, the first key, and the respective first time stamp, to form a respective joined record in a joined table; and, in response to matching each respective second time-series record with the respective first time-series record, removing, with at least one processor, the respective second time-series record from the at least one memory.

Clause 2: The method of clause 1, wherein the matching of each respective second time-series record with the respective first time-series record is carried out on one of a plurality of server nodes, and wherein each node of the plurality of server nodes executes an independent mapper to match a different subset of first time-series records of the set of first time-series records in parallel with each other node of the plurality of server nodes.

Clause 3: The method of clause 1 or clause 2, wherein at least one of the first table and the second table is skewed, the method further comprising: replicating, with at least one processor and before generating the set of first key-value pairs, each first time-series record of the set of first time-series records a predetermined number of times to yield a plurality of identical records for said each first time-series record, thereby increasing a size of the set of first time-series records in proportion to the predetermined number; and wherein the matching of each respective second time-series record with the respective first time-series record further comprises randomly matching said each respective second time-series record with one time-series record of the plurality of identical records for said respective first time-series record.

Clause 4: The method of any of clauses 1-3, wherein the predetermined number of times each first time-series record is replicated is at least ten.

Clause 5: The method of any of clauses 1-4, wherein a number of the plurality of identical records is a same number as the plurality of server nodes, wherein each identical record of the plurality of identical records is sent to a different mapper of the plurality of server nodes, and wherein the randomly matching of said each respective second time-series record further comprises randomly selecting a mapper of the plurality of server nodes.

Clause 6: The method of any of clauses 1-5, wherein the set of first time-series records comprises a plurality of transaction authorization records processed by a transaction processing system, and wherein the set of second time-series records comprises a plurality of transaction settlement records processed by the transaction processing system.

Clause 7: The method of any of clauses 1-6, wherein the removing of each respective second time-series record from the at least one memory occurs in real-time immediately after said each respective second time-series record is matched with the respective first time-series record.

Clause 8: A system comprising at least one server comprising at least one processor, wherein the at least one server is programmed or configured to: load a first table and a second table into at least one memory, the first table comprising a set of first time-series records and the second table comprising a set of second time-series records, each first time-series record of the set of first time-series records comprising a first plurality of attributes, and each second time-series record of the set of second time-series records comprising a second plurality of attributes, wherein a first attribute of the first plurality of attributes is of a target type and a second attribute of the second plurality of attributes is of the target type, and wherein the first plurality of attributes further comprises a respective first time stamp of each first time-series record and the second plurality of attributes further comprises a respective second time stamp of each second time-series record; generate a set of first key-value pairs based on the set of first time-series records of the first table and a set of second key-value pairs based on the set of second time-series records of the second table, wherein each first key-value pair of the set of first key-value pairs comprises, for each first time-series record, a first key based on the first attribute and a first value based on at least one first other attribute of the first plurality of attributes, and wherein each second key-value pair of the set of second key-value pairs comprises, for each second time-series record, a second key based on the second attribute and a second value based on at least one second other attribute of the second plurality of attributes; sort the set of first key-value pairs based on the first key and the respective first time stamp of each first time-series record; sort the set of second key-value pairs based on the second key and the respective second time stamp of each second time-series record; interleave the set of first key-value pairs with the set of second key-value pairs based on the respective first time stamp of each first time-series record and the respective second time stamp of each second time-series record; sequentially match each respective second time-series record with a respective first time-series record based on the second key, the respective second time stamp, the first key, and the respective first time stamp, to form a respective joined record in a joined table; and, in response to matching each respective second time-series record with the respective first time-series record, remove the respective second time-series record from the at least one memory.

Clause 9: The system of clause 8, wherein the at least one server comprises a plurality of server nodes, wherein matching each respective second time-series record with a respective first time-series record is carried out on one of the plurality of server nodes, and wherein each node of the plurality of server nodes executes an independent mapper to match a different subset of first time-series records of the set of first time-series records in parallel with each other node of the plurality of server nodes.

Clause 10: The system of clause 8 or clause 9, wherein at least one of the first table and the second table is skewed, and wherein the at least one server is further programmed or configured to: replicate, before generating the set of first key-value pairs, each first time-series record of the set of first time-series records a predetermined number of times to yield a plurality of identical records for said each first time-series record, thereby increasing a size of the set of first time-series records in proportion to the predetermined number; and wherein matching each respective second time-series record with a respective first time-series record further comprises randomly matching said each respective second time-series record with one time-series record of the plurality of identical records for said respective first time-series record.

Clause 11: The system of any of clauses 8-10, wherein the predetermined number of times each first time-series record is replicated is at least ten.

Clause 12: The system of any of clauses 8-11, wherein a number of the plurality of identical records is a same number as the plurality of server nodes, wherein each identical record of the plurality of identical records is sent to a different mapper of the plurality of server nodes, and wherein the randomly matching of said each respective second time-series record further comprises randomly selecting a mapper of the plurality of server nodes.

Clause 13: The system of any of clauses 8-12, wherein the at least one server is part of a transaction processing system, wherein the set of first time-series records comprises a plurality of transaction authorization records processed by the transaction processing system, and wherein the set of second time-series records comprises a plurality of transaction settlement records processed by the transaction processing system.

Clause 14: The system of any of clauses 8-13, wherein removing each respective second time-series record from the at least one memory occurs in real-time immediately after said each respective second time-series record is matched with the respective first time-series record.

Clause 15: A computer program product comprising at least one non-transitory computer-readable medium including program instructions that, when executed by at least one processor, cause the at least one processor to: load a first table and a second table into at least one memory, the first table comprising a set of first time-series records and the second table comprising a set of second time-series records, each first time-series record of the set of first time-series records comprising a first plurality of attributes, and each second time-series record of the set of second time-series records comprising a second plurality of attributes, wherein a first attribute of the first plurality of attributes is of a target type and a second attribute of the second plurality of attributes is of the target type, and wherein the first plurality of attributes further comprises a respective first time stamp of each first time-series record and the second plurality of attributes further comprises a respective second time stamp of each second time-series record; generate a set of first key-value pairs based on the set of first time-series records of the first table and a set of second key-value pairs based on the set of second time-series records of the second table, wherein each first key-value pair of the set of first key-value pairs comprises, for each first time-series record, a first key based on the first attribute and a first value based on at least one first other attribute of the first plurality of attributes, and wherein each second key-value pair of the set of second key-value pairs comprises, for each second time-series record, a second key based on the second attribute and a second value based on at least one second other attribute of the second plurality of attributes; sort the set of first key-value pairs based on the first key and the respective first time stamp of each first time-series record; sort the set of second key-value pairs based on the second key and the respective second time stamp of each second time-series record; interleave the set of first key-value pairs with the set of second key-value pairs based on the respective first time stamp of each first time-series record and the respective second time stamp of each second time-series record; sequentially match each respective second time-series record with a respective first time-series record based on the second key, the respective second time stamp, the first key, and the respective first time stamp, to form a respective joined record in a joined table; and, in response to matching each respective second time-series record with the respective first time-series record, remove the respective second time-series record from the at least one memory.

Clause 16: The computer program product of clause 15, wherein the at least one processor comprises a plurality of server nodes, wherein matching each respective second time-series record with a respective first time-series record is carried out on one of the plurality of server nodes, and wherein each node of the plurality of server nodes executes an independent mapper to match a different subset of first time-series records of the set of first time-series records in parallel with each other node of the plurality of server nodes.

Clause 17: The computer program product of clause 15 or clause 16, wherein at least one of the first table and the second table is skewed, and wherein the program instructions further cause the at least one processor to: replicate, before generating the set of first key-value pairs, each first time-series record of the set of first time-series records a predetermined number of times to yield a plurality of identical records for said each first time-series record, thereby increasing a size of the set of first time-series records in proportion to the predetermined number; and wherein matching each respective second time-series record with a respective first time-series record further comprises randomly matching said each respective second time-series record with one time-series record of the plurality of identical records for said respective first time-series record.

Clause 18: The computer program product of any of clauses 15-17, wherein the predetermined number of times each first time-series record is replicated is at least ten.

Clause 19: The computer program product of any of clauses 15-18, wherein a number of the plurality of identical records is a same number as the plurality of server nodes, wherein each identical record of the plurality of identical records is sent to a different mapper of the plurality of server nodes, and wherein the randomly matching of said each respective second time-series record further comprises randomly selecting a mapper of the plurality of server nodes.

Clause 20: The computer program product of any of clauses 15-19, wherein removing each respective second time-series record from the at least one memory occurs in real-time immediately after said each respective second time-series record is matched with the respective first time-series record.

Clause 21: A computer-implemented method comprising: partially or completely loading, with at least one processor, a first table and a second table into at least one memory, the first table comprising a set of first records and the second table comprising a set of second records, each first record of the set of first records comprising a first plurality of attributes, and each second record of the set of second records comprising a second plurality of attributes, wherein a first attribute of the first plurality of attributes is of a target type and a second attribute of the second plurality of attributes is of the target type, and wherein at least one of the first table and the second table is skewed; replicating, with at least one processor, each first record of the set of first records a predetermined number of times to yield a plurality of identical records for said each first record, thereby increasing a size of the set of first records in proportion to the predetermined number; generating, with at least one processor, a set of first key-value pairs based on the set of first records of the first table and a set of second key-value pairs based on the set of second records of the second table, wherein each first key-value pair of the set of first key-value pairs comprises, for each first record, a first key based on the first attribute and a first value based on at least one first other attribute of the first plurality of attributes, and wherein each second key-value pair of the set of second key-value pairs comprises, for each second record, a second key based on the second attribute and a second value based on at least one second other attribute of the second plurality of attributes; sorting, with at least one processor, the set of first key-value pairs based on the first key; sorting, with at least one processor, the set of second key-value pairs based on the second key; and matching, with at least one processor, each respective second record with a respective first record based on the second key and the first key, to form a respective joined record in a joined table, wherein the matching is carried out on one of a plurality of server nodes, wherein each node of the plurality of server nodes executes an independent mapper to match a different subset of first records of the set of first records in parallel with each other node of the plurality of server nodes, and wherein the matching of each respective second record with a respective first record further comprises randomly matching said each respective second record with one record of the plurality of identical records for said respective first record.

Clause 22: A system comprising at least one server comprising at least one processor, wherein the at least one server is programmed or configured to: partially or completely load a first table and a second table into at least one memory, the first table comprising a set of first records and the second table comprising a set of second records, each first record of the set of first records comprising a first plurality of attributes, and each second record of the set of second records comprising a second plurality of attributes, wherein a first attribute of the first plurality of attributes is of a target type and a second attribute of the second plurality of attributes is of the target type, and wherein at least one of the first table and the second table is skewed; replicate each first record of the set of first records a predetermined number of times to yield a plurality of identical records for said each first record, thereby increasing a size of the set of first records in proportion to the predetermined number; generate a set of first key-value pairs based on the set of first records of the first table and a set of second key-value pairs based on the set of second records of the second table, wherein each first key-value pair of the set of first key-value pairs comprises, for each first record, a first key based on the first attribute and a first value based on at least one first other attribute of the first plurality of attributes, and wherein each second key-value pair of the set of second key-value pairs comprises, for each second record, a second key based on the second attribute and a second value based on at least one second other attribute of the second plurality of attributes; sort the set of first key-value pairs based on the first key; sort the set of second key-value pairs based on the second key; and match each respective second record with a respective first record based on the second key and the first key, to form a respective joined record in a joined table, wherein the matching is carried out on one of a plurality of server nodes, wherein each node of the plurality of server nodes executes an independent mapper to match a different subset of first records of the set of first records in parallel with each other node of the plurality of server nodes, and wherein the matching of each respective second record with a respective first record further comprises randomly matching said each respective second record with one record of the plurality of identical records for said respective first record.

Clause 23: A computer program product comprising at least one non-transitory computer-readable medium including program instructions that, when executed by at least one processor, cause the at least one processor to: partially or completely load a first table and a second table into at least one memory, the first table comprising a set of first records and the second table comprising a set of second records, each first record of the set of first records comprising a first plurality of attributes, and each second record of the set of second records comprising a second plurality of attributes, wherein a first attribute of the first plurality of attributes is of a target type and a second attribute of the second plurality of attributes is of the target type, and wherein at least one of the first table and the second table is skewed; replicate each first record of the set of first records a predetermined number of times to yield a plurality of identical records for said each first record, thereby increasing a size of the set of first records in proportion to the predetermined number; generate a set of first key-value pairs based on the set of first records of the first table and a set of second key-value pairs based on the set of second records of the second table, wherein each first key-value pair of the set of first key-value pairs comprises, for each first record, a first key based on the first attribute and a first value based on at least one first other attribute of the first plurality of attributes, and wherein each second key-value pair of the set of second key-value pairs comprises, for each second record, a second key based on the second attribute and a second value based on at least one second other attribute of the second plurality of attributes; sort the set of first key-value pairs based on the first key; sort the set of second key-value pairs based on the second key; and match each respective second record with a respective first record based on the second key and the first key, to form a respective joined record in a joined table, wherein the matching is carried out on one of a plurality of server nodes, wherein each node of the plurality of server nodes executes an independent mapper to match a different subset of first records of the set of first records in parallel with each other node of the plurality of server nodes, and wherein the matching of each respective second record with a respective first record further comprises randomly matching said each respective second record with one record of the plurality of identical records for said respective first record.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying figures, in which.

Figure 1:
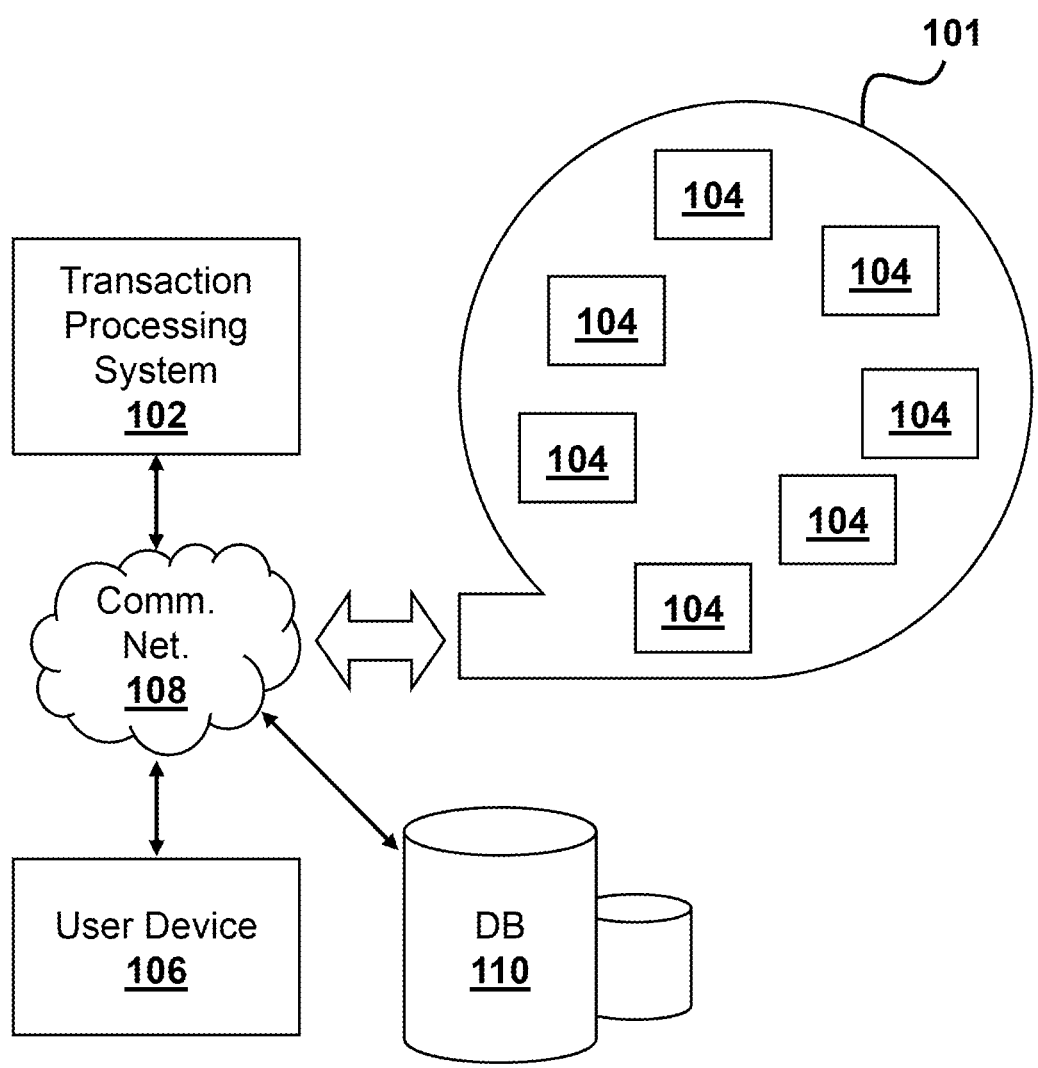
FIG. 1 is a schematic diagram of a system for efficiently joining data tables, according to some non-limiting embodiments or aspects.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

The systems, methods, and computer program products described herein provide numerous technical advantages and improvements in systems for efficiently joining data tables. As described herein, the disclosure provides for more computationally efficient techniques (e.g., faster, better data distribution for parallel processing, etc.) for joining large data tables, including for data tables of time-series records and data tables of unequal size. For example, for two tables of time-series data, the records may be sorted in time order, interleaved, and matched by a common key value, such as in a mapper. The transactions may be then processed in a streaming manner, such as in a reducer function, and once one of the records is matched, it may be freed from memory. Doing so reduces the computational memory footprint for a join of two time-series data tables.

Moreover, for joining two tables with data skew, the present disclosure provides a technical solution for improved parallel processing, such that overall computational time is reduced. For example, for the smaller table, records may be replicated a number of times, and each replicated record may be assigned to a separate mapper. The second larger table may then be joined by matching a record of the second table with one of the many identical records from one of the mappers. One of the mappers may be randomly chosen for matching a record from the first table and a record from the second table. In this fashion, one mapper (e.g., being executed on one server node) may be prevented from being relied on for a proportionally overly large number of the matches with the second table. By way of further example, when merging a merchant table (e.g., a comparatively smaller table) with a transaction authorization table (e.g., a comparatively larger table), certain merchant records may be associated with a high number of transactions. By replicating merchant records and allocating the replicated merchant records to multiple mappers, then more than one mapper may be used to match transactions with each merchant. This prevents one mapper from becoming unbalanced and being utilized for an overly large proportion of matches simply because it contains a merchant record corresponding to a large number of transactions. The above-described solutions thereby reduce overall computation time.

In practical experimentation, employing the methods described herein has shown significant improvements in computational speed. For example, for joining several tables (e.g., authorization data table, settlement data table, fraud data table, and merchant data table) for transactions processed over a period of more than six months, the described methods decreased overall computation time by a factor of seventeen times. Joining the same data tables over even larger periods of time, such as two years, has shown improvements in computational speed by a factor of thirty. In other words, if joining billions of records of transaction data from a number of tables populated over a period of two years previously took two months, the described methods would improve that process to take only two days for the same join. This allows for much more rapid analysis and response in other systems that rely on the combined data tables.

Referring now to FIG. 1, a system 100 for efficiently joining data tables is shown, according to some non-limiting embodiments or aspects. Specifically, the system 100 may include transaction processing system 102, a server cluster 101 including a plurality of server nodes 104, a user device 106, a database 110, and a communication network 108.

Transaction processing system 102 may include one or more computing devices configured to communicate with a user device 106, server cluster 101, and/or database 110, including at least partly over a communication network 108. In some non-limiting embodiments or aspects, transaction processing system 102 may include server cluster 101, user device 106, database 110, and/or communication network 108. In some non-limiting embodiments or aspects, transaction processing system 102 may receive and process transaction authorization requests generated from merchants and/or acquirer systems, thereby populating a transaction authorization data table of database 110 on an ongoing (e.g., continual) basis. Transaction processing system 102 may further facilitate the settlement of the transactions it processes on an ongoing basis, thereby populating a transaction settlement data table of database 110 on an ongoing basis. Transaction processing system 102 may further include a fraud detection system and may maintain a transaction fraud data table of database 110. Transaction processing system 102 may further maintain merchant data in a merchant data table in database 110. It will be appreciated that other types of systems, other than those in an electronic payment processing network, may be employed in connection with the techniques for joining data tables described herein.

Server cluster 101 may include one or more computing devices, such as a plurality of server nodes 104, configured to communicate with transaction processing system 102, user device 106, and/or database 110, including at least partly over communication network 108. For executing a join process of two data tables, each server node 104 may be associated with one or more mappers (described further herein below, also called "map functions" or "mapper functions"). Each server node 104 may be further associated with one or more reducers (described further herein below, also called "reduce functions" or "reducer functions"). The server cluster 101 may receive a data input, such as data tables to be joined, and may execute a mapper-reducer (also called a "mapper-reducer function" or a "MapReduce function") to join two or more data tables together. The output results of the mapper-reducer may be a combined (e.g., joined) data table. The server cluster 101 may be configured for parallel processing, such as a Hadoop® cluster. One or more process steps attributed to server cluster 101 may be executed by one or more server nodes 104 of the server cluster 101.

User device 106 may include one or more computing devices configured to communicate with transaction processing system 102, server cluster 101, and/or database 110, including at least partly over communication network 108. User device 106 may be used by personnel to request the joining of two or more data tables. User device 106 may also receive display data configured to display at least a portion of the results of a combined data table. Moreover, user device 106 may be used to initiate one or more analysis processes based on a combined data table of two or more tables.

Database 110 may include one or more computing devices, including one or more distributed and networked data repositories, configured to communicate with transaction processing system 102, server cluster 101, and/or user device 106, including at least partly over communication network 108. Database 110 may be configured to store two or more data tables that may be joined according to methods of the present disclosure. Database 110 may also be configured to store the output results of a combined data table. Database 110 may be configured to store data tables in a relational database system. The data tables of database 110 may include a plurality of records (e.g., rows) including a plurality of attributes (e.g., columns). Time-series data tables in database 110 may include records having an attribute with a type of a date-time, such as a timestamp. Attributes may include various other types, include Boolean values, text values, categorical values, hash values, numerical values, and/or the like. Two attributes may be said to be of a same type when said attributes have a same kind of value and/or format such that the values of the two attributes can be compared and determined if they are equal. For example, records in two different tables may each have an attribute of a transaction identifier (ID), which may include a unique numerical identifier to identify a transaction—said records may then be considered to have attributes of the same type, namely, transaction ID. While attributes of the same type often have the same name, attributes of the same type may have different names (e.g., "TRANS_ID" and "TID") but still be capable of comparison to identify a matching value. A column that is used to join two tables may be considered an attribute of the same type for both tables.

Communication network 108 may include one or more wired and/or wireless networks. For example, communication network 108 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

With further reference to FIG. 1, server cluster 101 may load (e.g., partially or completely) a first table and a second table into at least one memory (e.g., of the one or more server nodes 104). The first table may include a set of first time-series records, and each first time-series record may include a first plurality of attributes. The second table may include a set of second time-series records, and each second time-series record may include a second plurality of attributes. The first plurality of attributes and the second plurality of attributes may share an attribute of the same type (also referred to herein as a "target" type, which may refer to the target attribute for joining the two tables). The first plurality of attributes may further include a time stamp attribute (e.g., a date-time value) such that each first time-series record has a respective time stamp (e.g., a respective first time stamp). The second plurality of attributes may also include a time stamp attribute such that each second time-series record has a respective time stamp (e.g., a respective second time stamp).

Server cluster 101 may further generate a set of first key-value pairs based on the set of first time-series records of the first table. Each first key-value pair of the set of first key-value pairs may include (for each first time-series record) a key (e.g., a first key) based on the attribute of the target type and a value (e.g., a first value) that includes one or more attributes of the first plurality of attributes. Server cluster 101 may sort the set of first key-value pairs based on the first key and the respective first time stamp of each first time-series record (e.g., the key-value pairs of the first time-series records being sorted in time order from oldest to newest). Server cluster 101 may further generate a set of second key-value pairs based on the set of second time-series records of the second table. Each second key-value pair of the set of second key-value pairs may include (for each second time-series record) a key (e.g., a second key) based on the attribute of the target type and a value (e.g., a second value) that includes one or more attributes of the second plurality of attributes. Server cluster 101 may sort the set of second key-value pairs based on the second key and the respective second time stamp of each second time-series record (e.g., the key-value pairs of the second time-series records being sorted in time order from oldest to newest).

Server cluster 101 may interleave (e.g., combine in a set in an alternating fashion) the set of first key-value pairs with the set of second key-value pairs based on the respective first time stamp of each first time-series record and the respective second time stamp of each second time-series record. For example, the combined, interleaved set of first key-value pairs and second key-value pairs may be arranged in time order (e.g., descending or ascending) after being output from a mapper. An illustrative example of an interleaving process is shown further in FIG. 8.

Server cluster 101 may sequentially match (e.g., matching in the same order as the sort described above) each respective second time-series record with a respective first time-series record based on the second key, the respective second time stamp, the first key, and the respective first time stamp, to form a respective joined record in a joined table. For example, where the first key and the second key match, and where the respective time stamps are within an acceptable interval of time of each other and/or time order (e.g., within an hour, within a week, within a month, etc., and/or where the second record has a time stamp occurring after the first record's time stamp). By way of further example, the second time-series record may be a transaction settlement record and the first time-series record may be a transaction authorization record. The match may be based on a common key (e.g., merchant ID, transaction ID, account ID, etc.) and the settlement record may require a time stamp after the authorization record, but within a threshold interval of time (e.g., within a week, within a month, etc.). Each server node 104 of the plurality of server nodes 104 may execute an independent mapper to match a different subset of first time-series records of the set of time-series records in parallel with each other server node 104 of the plurality of server nodes 104. A mapper may refer to a function that receives input (e.g., table records, <key,value> pairs, etc.), processes them (e.g., sorts, arranges, partitions, etc.), and produces a set of <key,value> pairs as output. A reducer may refer to a function that receives the output from the mapper and iterates through the values that are associated with a key and produce zero or more outputs (e.g., a join, a count, a reduced list, etc.). A mapper may be paired with a reducer in a mapper-reducer. A mapper-reducer includes a mapper, which performs filtering and sorting, and a reducer, which performs a summary operation. A mapper-reducer facilitates processing big data sets in parallel by using distributed servers, such as the server cluster 101, to execute tasks in parallel.

In response to matching each respective second time-series record with the respective time-series record, server cluster 101 may remove the respective second time-series record from the at least one memory. For example, the second time-series record may be removed as it is represented in the interleaved list of keys, in view of the second time-series record not needing to be used for matches with subsequent records further down the interleaved list. Removing records from memory once a match is made, especially before the matching process for all records is complete, reduces the memory footprint (e.g., overall computational storage capacity required) of the server cluster 101 for the join operation. Removal of each respective time-series record from memory may occur in real-time immediately after said each respective second time-series record is matched with the respective first time-series record.

Certain table joins may be skewed. When the number of records for a value in the join attribute vary substantially, the join is skewed. Joining unequally sized tables may contribute to data skew. Accordingly, server cluster 101 may, before generating the set of first key-value pairs, replicate each first time-series record of the set of first time-series records to yield a plurality of identical records for said each first time-series record. Doing so thereby increases a size of the set of first time-series records in proportion to the predetermined number (e.g., a set of size x that is replicated y times would have an end size of x(y+1)). For example, if each first time-series record of the set of first time-series records is replicated n times (e.g. ten times), then there may be n+1 copies (e.g., eleven copies, including ten replicated copies plus an original copy) of said each first time-series record. After replication, matching each respective second time-series record with a respective first time-series record may include randomly matching said each respective second time-series record with one time-series record of the plurality of identical records for said respective first time-series record. The number of times each first time-series record is replicated may be a same number as the plurality of server nodes 104. An identical record of the plurality of identical records may be sent to a different mapper of the plurality of server nodes, and randomly matching each respective second time-series record may include randomly selecting a mapper of the plurality of server nodes 104. A process for addressing data skew is further detailed in connection with FIG. 7.

The number and arrangement of devices and/or systems shown in FIG. 1 are provided as an example. In some non-limiting embodiments or aspects, system 100 may include additional devices and/or systems, fewer devices and/or systems, different devices and/or systems, or differently arranged devices and/or systems than those shown in FIG. 1. Additionally, or alternatively, a set of devices and/or systems (e.g., one or more devices and/or systems) of system 100 may perform one or more functions described as being performed by another set of devices and/or systems of system 100.

Figure 2:
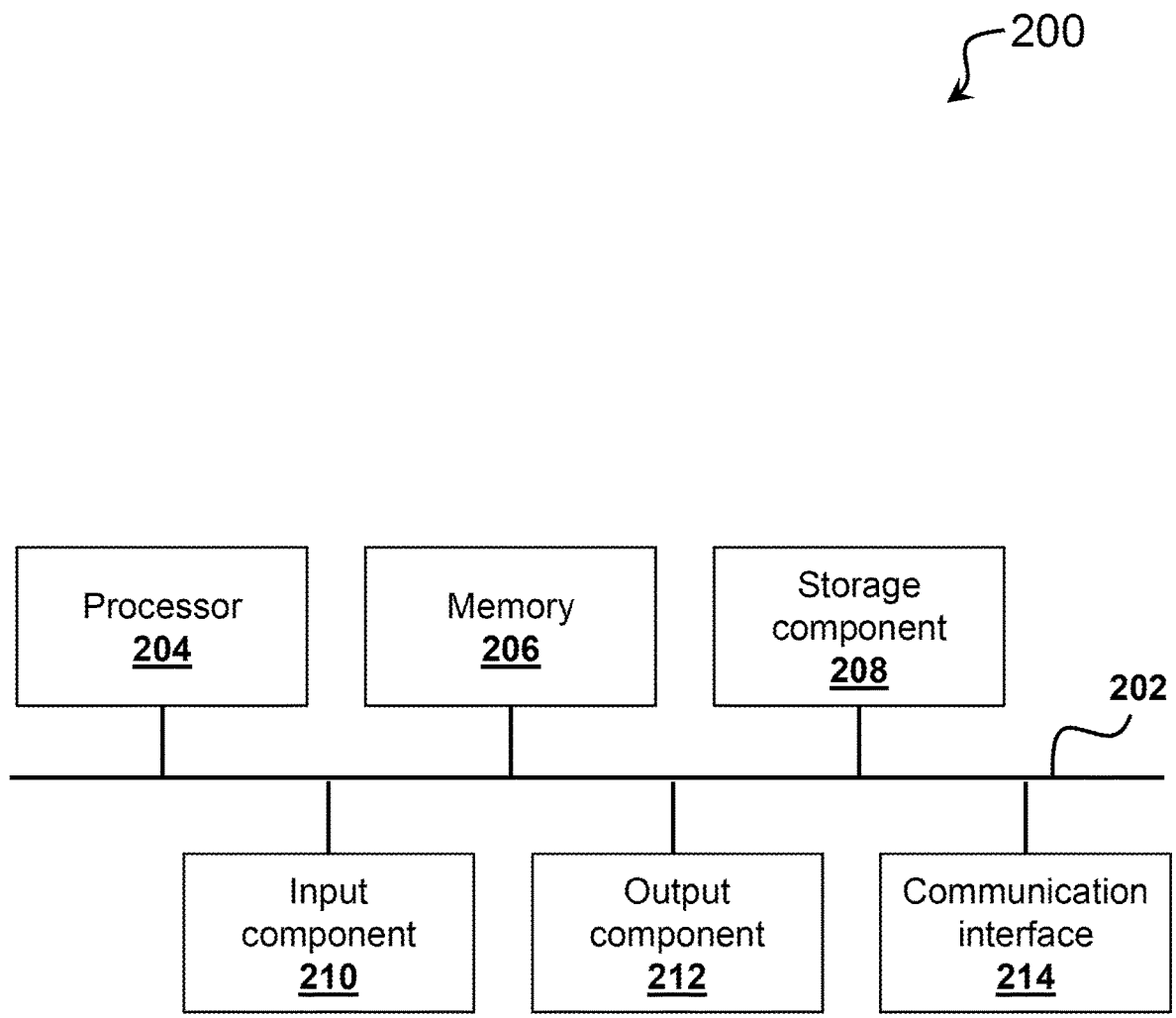
FIG. 2 is a diagram of one or more components, devices, and/or systems, according to some non-limiting embodiments or aspects.

Referring now to FIG. 2, shown is a diagram of example components of a device 200, according to some non-limiting embodiments or aspects. Device 200 may correspond to one or more devices of the transaction processing system 102, server cluster 101, server nodes 104, user device 106, database 110, and/or communication network 108, as shown in FIG. 1. In some non-limiting embodiments or aspects, such systems or devices may include at least one device 200 and/or at least one component of device 200. The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software. The term "programmed or configured," as used herein, refers to an arrangement of software, hardware circuitry, or any combination thereof on one or more devices.

Figure 3:
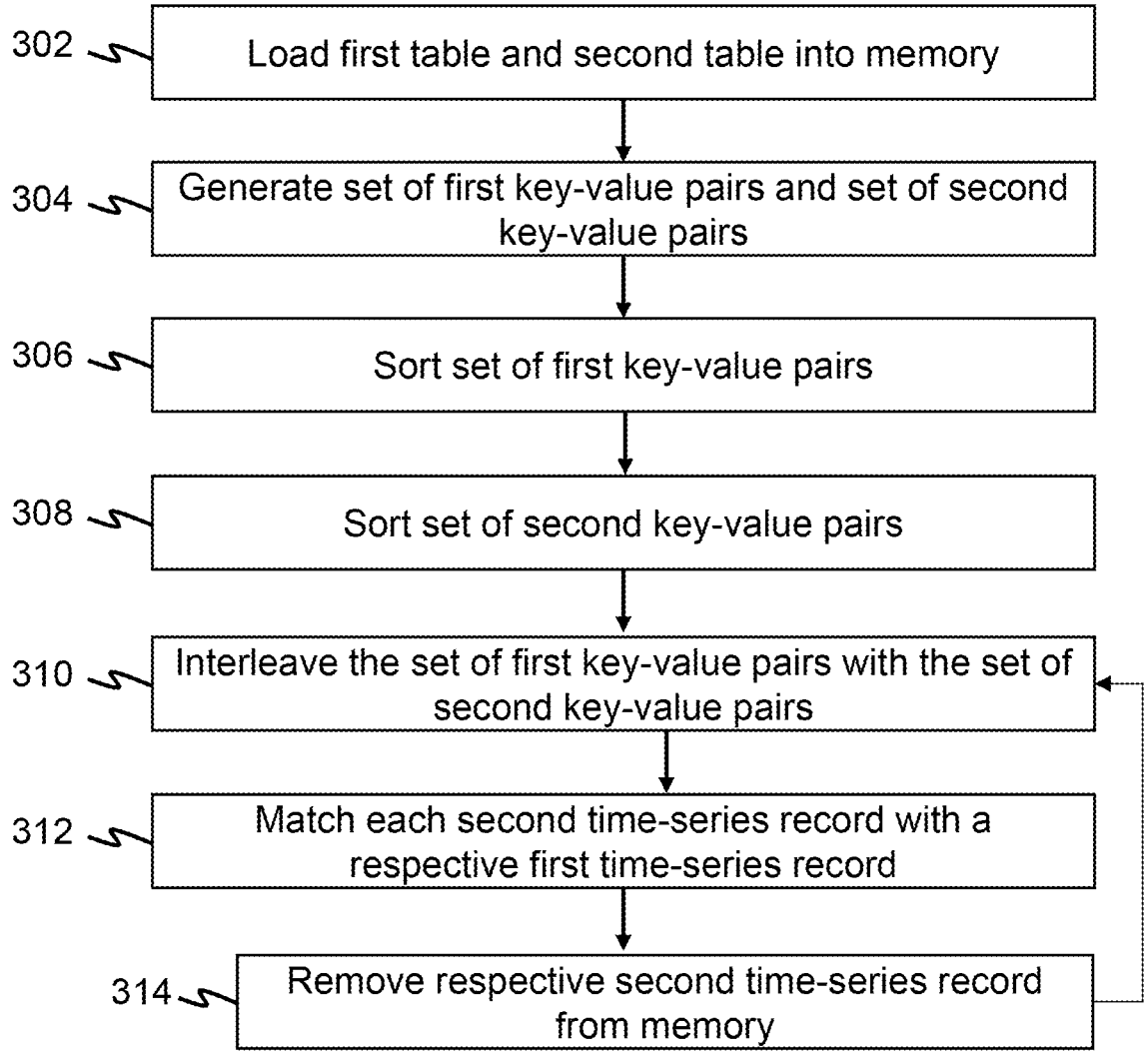
FIG. 3 is a flow diagram of a method for efficiently joining time-series data tables, according to some non-limiting embodiments or aspects.

Referring now to FIG. 3, a flow diagram of a method 300 for efficiently joining time-series data tables is shown, according to some non-limiting embodiments or aspects of the present disclosure. The method 300 may be performed by one or more processors of a server cluster 101, transaction processing system 102, and/or another computing device. One or more steps performed by a first processor may be performed by a same or different processor. The steps shown in FIG. 3 are for example purposes only. It will be appreciated that additional, fewer, different, and/or a different order of steps may be used in non-limiting embodiments or aspects.

In step 302, a first table and a second table may be loaded (e.g., partially or completely) into at least one memory. For example, server cluster 101 may load a first table and a second table into at least one memory (e.g., of one or more server nodes 104). The first table may include a set of first time-series records (e.g., transaction authorization records of authorization requests for transactions processed by the transaction processing system 102) and the second table may include a set of second time-series records (e.g., transaction settlement records of the settlement requests for transactions processed by the transaction processing system 102). Each first time-series record may include a first plurality of attributes, and each second time-series record may include a second plurality of attributes. The first plurality of attributes and the second plurality of attributes have the same or different types of attributes. A first attribute of the first plurality of attributes may be of a target type (e.g., a type intended to be used as a key) and a second attribute of the second plurality of attributes may be of the target type. The first plurality of attributes may further include a respective first time stamp for each first time-series record, and the second plurality of attributes may further include a respective second time stamp for each time-series record.

In step 304, a set of first key-value pairs and a set of second key-value pairs may be generated. For example, server cluster 101 may generate a set of first key-value pairs based on the set of first time-series records of the first table and a set of second key-value pairs based on the set of second time-series records of the second table. Each first key-value pair may include, for each corresponding first time-series record, a first key based on the first attribute of the target type and a first value based on one or more other first attributes of the first plurality of attributes. Each second key-value pair may include, for each corresponding second time-series record, a second key based on the second attribute of the target type and a second value based on one or more other second attributes of the second plurality of attributes.

In step 306, the set of first key-value pairs may be sorted. For example, server cluster 101 may sort the set of first key-value pairs based on the first key and the respective first time stamp of each second time-series record. By way of further example, the sort may be executed first on a key and second on the time stamp, first on the time stamp then second on the key, or any combination thereof.

In step 308, the set of second key-value pairs may be sorted. For example, server cluster 101 may sort the set of second key-value pairs based on the second key and the respective second time stamp of each second time-series record. By way of further example, the sort may be executed first on a key and second on the time stamp, first on the time stamp then second on the key, or any combination thereof.

In step 310, the set of first key-value pairs may be interleaved with the set of second key-value pairs. For example, server cluster 101 may interleave the set of first key-value pairs with the set of second key-value pairs based on the respective first time stamp of each first time-series record and the respective second time stamp of each second time-series record.

In step 312, each respective second time-series record may be matched with a respective first time-series record. For example, server cluster 101 may sequentially match each respective second time-series record with a respective first time-series record based on the second key, the respective second time stamp, the first key, and the respective first time stamp, to form a respective joined record in a joined table. By way of further example, the joined record may be a result of matching the keys of the respective key-value pairs, and may be based on a time interval between time stamps of a respective record being within a predetermined threshold. The matching of each respective second time-series record with a respective first time-series record may be carried out on one of the plurality of server nodes 104 of the server cluster 101. Each node 104 of the server cluster 101 may execute an independent mapper to match a different subset of first time-series records of the set of first time-series records in parallel with each other server node 104 of the server cluster 101.

In step 314, each respective second time-series record may be removed from memory. For example, in response to matching each respective second time-series record with the respective first time-series record, the server cluster 101 may remove the respective time-series record from the at least one memory. The removal may occur in real-time immediately (e.g., directly after) when each respective second time-series record is matched with the respective first time-series record.

Figure 4:
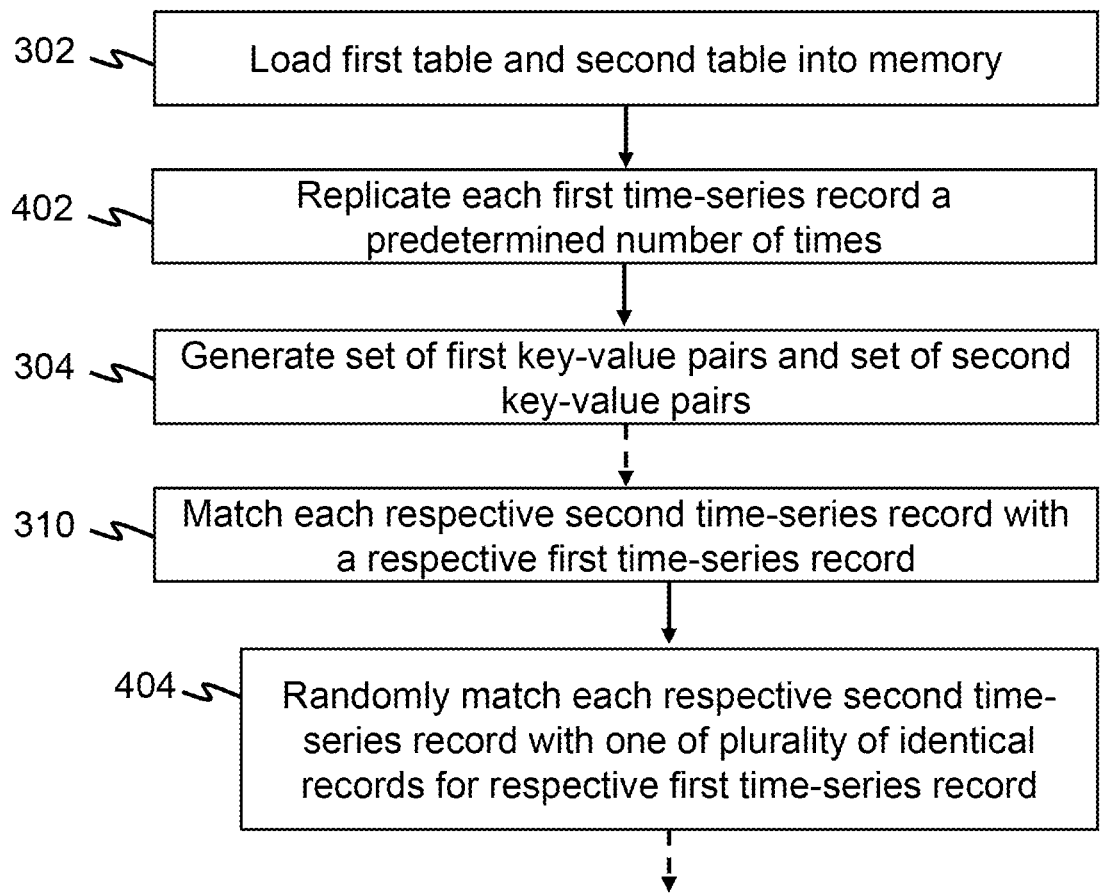
FIG. 4 is a flow diagram of a method for efficiently joining data tables with data skew, according to some non-limiting embodiments or aspects.

Referring now to FIG. 4, a flow diagram of a method 400 for efficiently joining data tables of unequal size is shown, according to some non-limiting embodiments or aspects of the present disclosure. The method 400 may be performed by one or more processors of a server cluster 101, transaction processing system 102, and/or other computing device. One or more steps performed by a first processor may be performed by a same or different processor. The steps shown in FIG. 4 are for example purposes only. It will be appreciated that additional, fewer, different, and/or a different order of steps may be used in non-limiting embodiments or aspects.

After executing step 302, described above in connection with FIG. 3, step 402 may include replicating each first time-series record a predetermined number of times. For example, server cluster 101 may replicate, before generating the set of first key-value pairs in step 304, each first time-series record of the set of first time-series records a predetermined number of times (e.g., two, five, ten, etc.) to yield a plurality of identical records for said each first time-series record, thereby increasing a size of the set of first time-series records in proportion to the predetermined number. The predetermined number of times each time-series record is replicated may be a same number as the plurality of server nodes 104. Each identical record of the plurality of identical records may be sent to a different mapper of the plurality of server nodes 104.

After generating the set of first key-value pairs and the set of second key-value pairs in step 304, the server cluster 101 may match each respective second time-series record with a respective first time-series record, in step 310. Matching may comprise, in sub-step 404, randomly matching said each respective second time-series record with one time-series record of the plurality of identical records for said respective first time-series record. Randomly matching said each respective second time-series record may further include randomly selecting a mapper of the plurality of server nodes 104 that have a mapper including one of the identical records of said respective first-time series record. It will also be appreciated that steps 306 and 308, described in connection with FIG. 3, may be executed between step 304 and step 310 depicted in FIG. 4.

Figure 5:
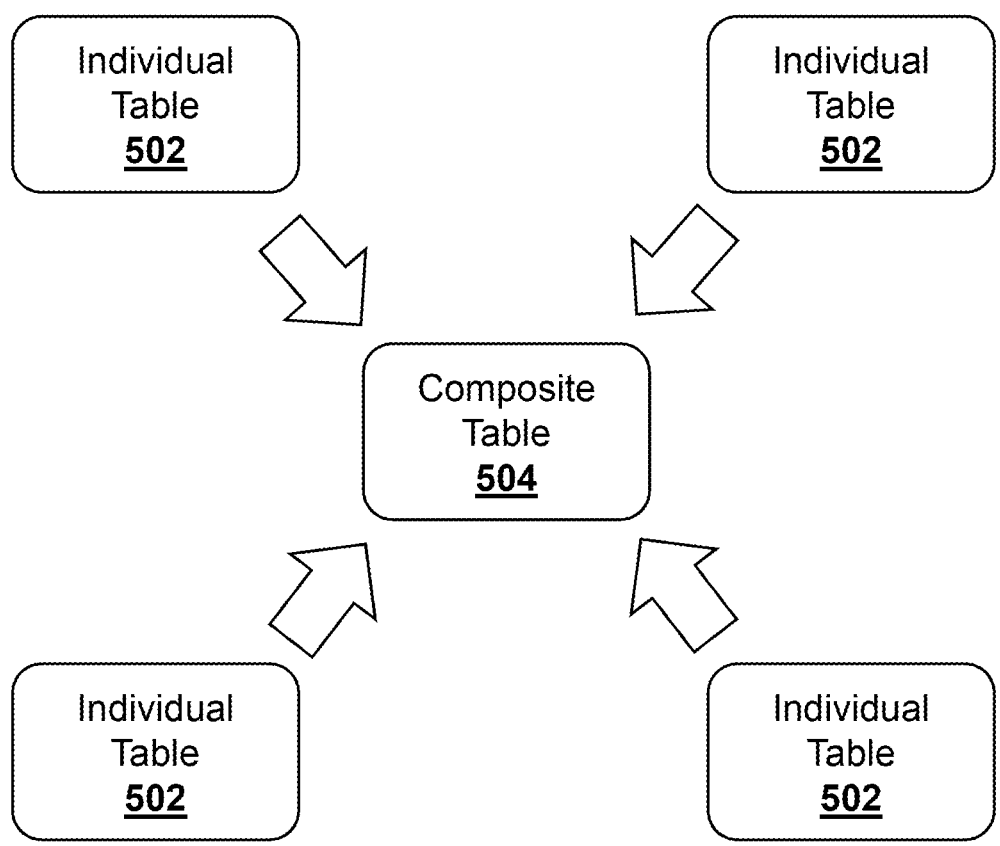
FIG. 5 is an illustrative diagram of a method for efficiently joining large data tables, according to some non-limiting embodiments or aspects.

Referring now to FIG. 5, an illustrative diagram of a method 500 for efficiently joining data tables is shown, according to some non-limiting embodiments or aspects of the present disclosure. The method 500 may be performed by one or more processors of a server cluster 101, transaction processing system 102, and/or another computing device. As shown, the methods described herein for joining two tables may be executed a number of times to join more than two tables. For example, a plurality of individual tables 502 may be joined into a composite table 504 by joining a first pair of individual tables 502 and sequentially joining additional individual tables 502. By way of further example, where this disclosure is implemented in an electronic payment processing network, a first individual table 502 may be a transaction authorization record table, a second individual table 502 may be a transaction settlement record table, a third individual table 502 may be a transaction fraud record table, and a fourth individual table 502 may be a merchant record table. It will be appreciated that many configurations and environments are possible.

Figure 6:
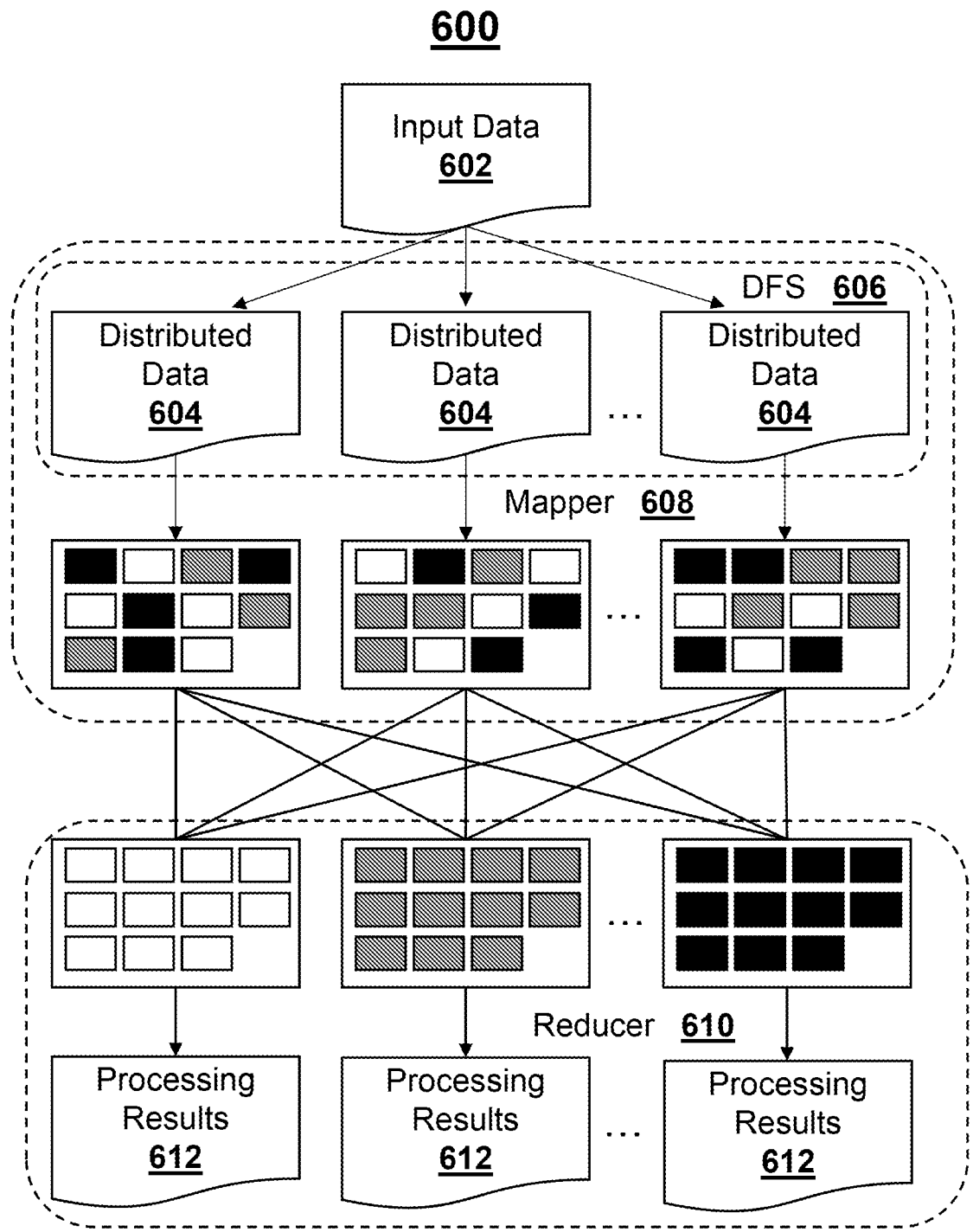
FIG. 6 is a schematic and flow diagram of a system and method for efficiently joining data tables, according to some non-limiting embodiments or aspects.

Referring now to FIG. 6, a schematic and flow diagram of a method 600 for efficiently joining data tables is shown, according to some non-limiting embodiments or aspects of the present disclosure. The method 600 may be performed by one or more processors of a server cluster 101, transaction processing system 102, database 110, and/or other computing device. One or more steps performed by a first processor may be performed by a same or different processor. Method 600 may be referred to herein as executing a mapper-reducer for use in joining two or more tables.

Input data 602 may be initially received for a mapper-reducer. The input data 602 may include at least one table. The input data 602 may be divided into distributed data 604 and may be sent to a distributed file system (DFS) 606. The distributed data 604 may be each sent to a server node 104 of a server cluster 101, for example. A mapper 608 (e.g., one for each set of distributed data 604) may read the distributed data 604, add tags to distinguish different tables, and output key-value pairs. The key of the key-value pair may be the attribute of the record on which tables are joined, and the value of the key-value pair may include the remaining attributes of a record.

The output of the mapper 608 may be shuffled (e.g., rearranged through data transfer) to be input to a reducer 610 (e.g., one for each set of distributed data 604). The reducer 610 may receive the key-value pairs for a key, aggregate values for a key, and produce an output of the join. The output of the reducer 610 may be individual processing results 612, which may be aggregated to receive a final output of the mapper-reducer.

Figure 7:
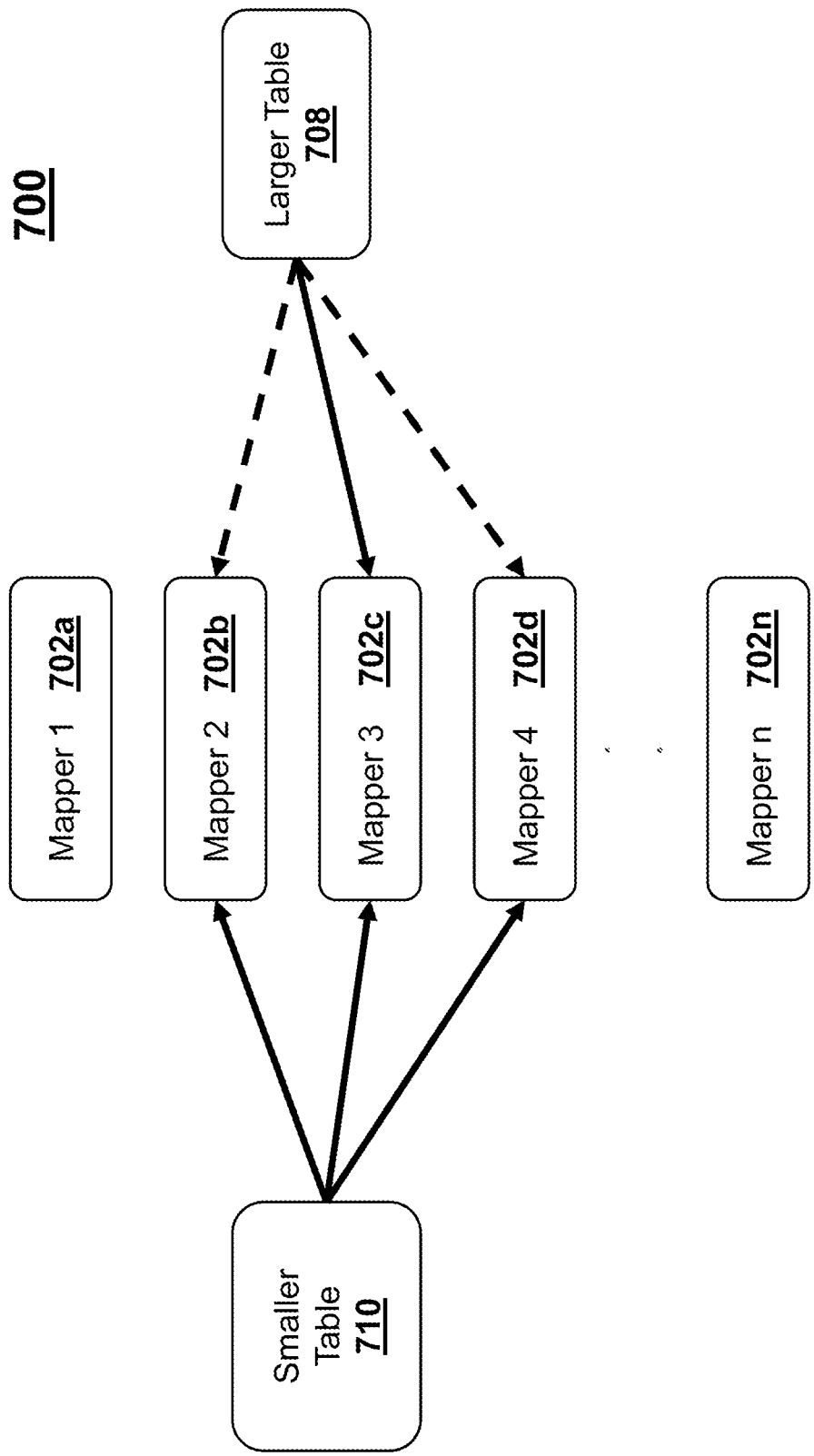
FIG. 7 is a schematic diagram of a method for efficiently joining data tables of with data skew, according to some non-limiting embodiments or aspects.

Referring now to FIG. 7, a schematic diagram of a method 700 for efficiently joining data tables with data skew is shown, according to some non-limiting embodiments or aspects of the present disclosure. The method 700 may be performed by one or more processors of a server cluster 101, transaction processing system 102, database 110, and/or other computing device. One or more steps performed by a first processor may be performed by a same or different processor.

As shown, a join of two tables may include a smaller table 710 and a larger skewed table 708. To prevent the issue of data skew, the server cluster 101 may, before generating the set of first key-value pairs, replicate each record of the smaller table 710 a predetermined number of times to yield a plurality of identical records for said each record, thereby increasing a size of the set of records from the smaller table 710 in proportion to the predetermined number. One of each of the plurality of identical records may be assigned to a different mapper, such as one or more of a plurality of mappers 702a, 702b, 702c, 702d, 702n. Matching records of the larger table 708 with records of the smaller table 710 may include matching each of the records of the larger table 708 with one of the plurality of identical records from one of the mappers 702a, 702b, 702c, 702d, 702n. A mapper 702a, 702b, 702c, 702d, 702n may each correspond with one server node 104 of the server cluster 101.

Figure 8:
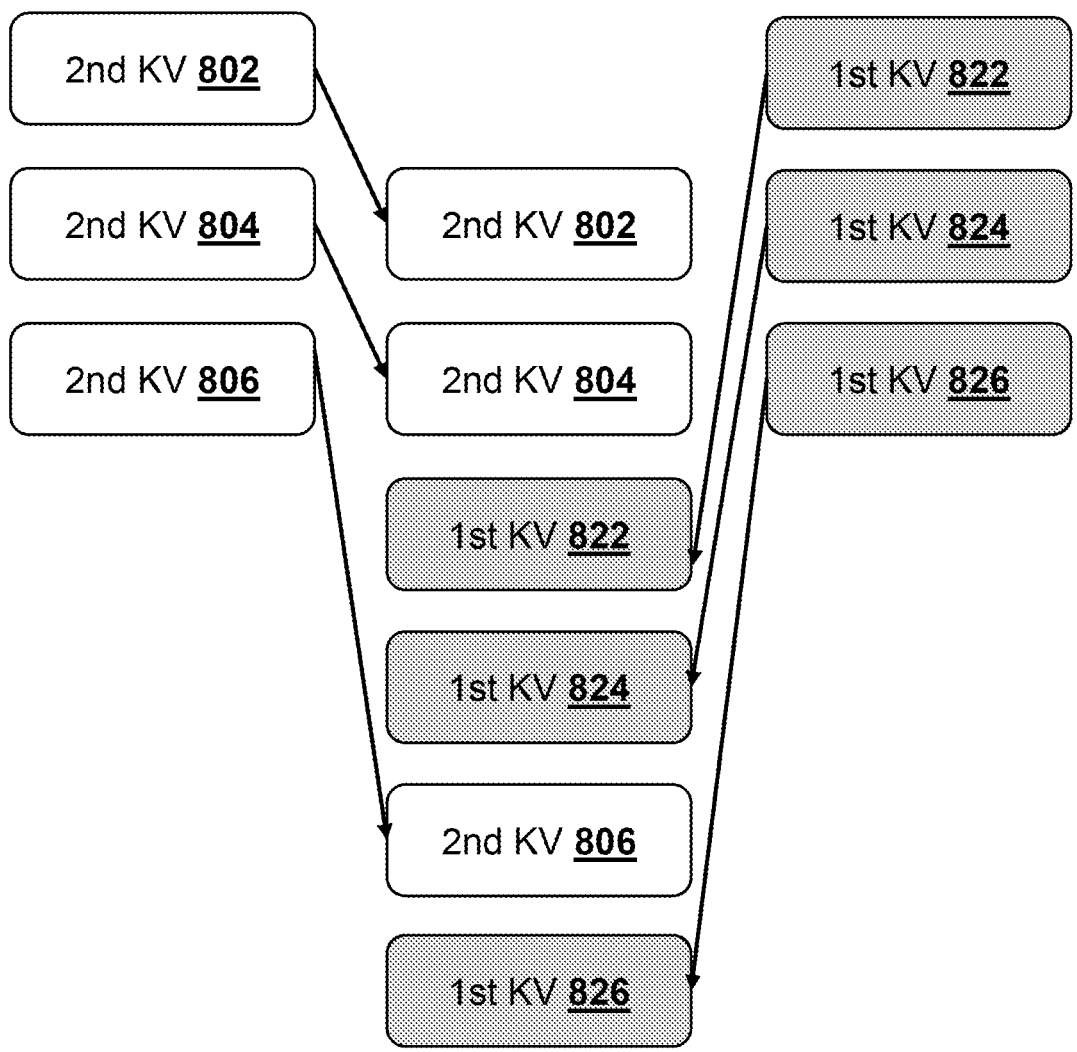
FIG. 8 is a schematic diagram of a method for efficiently joining time-series data tables, according to some non-limiting embodiments or aspects.

Referring now to FIG. 8, a schematic diagram of a method 800 for efficiently joining time-series data tables is shown, according to some non-limiting embodiments or aspects of the present disclosure. The method 800 may be performed by one or more processors of a server cluster 101, transaction processing system 102, database 110, and/or other computing device. One or more steps performed by a first processor may be performed by a same or different processor.

As shown, a set of second key-value pairs 802, 804, 806 have been sorted, as have a set of first key-value pairs 822, 824, 826. After sorting, the sets of key-value pairs may be interleaved. Interleaving may be based on a respective time stamp of the records corresponding to each key-value pair. For example, as depicted, the time stamps of the key-value pairs may be ordered chronologically as follows: 802, 804, 822, 824, 806, and 826. This allows for corresponding time-series records to be matched by proceeding sequentially through the interleaved key-value pairs to find matches between second key-value pairs and first key-value pairs. For example, second key-value pair 802 may correspond with first key-value pair 822, according to the key of each pair and based on the time stamp of the respective key-value pairs being close enough in time (e.g., within a day, week, etc.). Second key-value pair 804 may likewise correspond with first key-value pair 824, and second key-value pair 806 may correspond with first-key value pair 826. Based on the correspondences between second key-value pairs 802, 804, 806 and first key-value pairs 822, 824, 826 in the interleaved set, the respective time-series records related to said key-value pairs may be matched in a sequential order. Once a match is made, at least one of the time-series records related to a matched set of key-value pairs may be removed from memory, to reduce overall memory required for the join.

With further reference to the foregoing figures, a number of computational and speed improvements may be combined to support the underlying join of two or more tables. In some non-limiting embodiments or aspects, a reduce-side join based on the MapReduce framework (described above) may be employed to allow for scalability of joining large data tables. This is further detailed in connection with FIG. 6.

In some non-limiting embodiments or aspects, multi-format input handling may be implemented to directly read files of the input tables. This may include a combined file reader that merges small input files together, which reduces the number of mappers (thereby reducing computational overhead), and which reduces skew across mappers. This may further include handling multiple schemas, such as by employing multiple Apache® Parquet readers with handling different schemas. Parquet is a data format for columnar data. The Parquet files may be directly read by the mappers to handle the partition logic. Furthermore, flat data structures may be used for handling Parquet files, to reduce the memory footprint further.

In some non-limiting embodiments or aspects, custom light-weight Parquet data structures may be employed. This may include pushdown projections and selections that are handled by the Parquet file reader, which reduces input-output processing and improves read performance. A pushdown projection may include projecting a number of attributes (e.g., ~100 fields of a larger domain of ~1000 fields), selecting, and joining two tables. A pushdown selection may include joining, selecting attributes from respective tables, and separately projecting (e.g., ~10 fields from a larger domain of ~100 fields, and ~100 fields from a larger domain of ~1000 fields).

In some non-limiting embodiments or aspects, a data skew handling method may be employed, such as the method 700 shown in FIG. 7. Moreover, a streaming join method may be employed, such as the method 800 shown in FIG. 8.

In some non-limiting embodiments or aspects, user-defined functions may be executed in connection with the other techniques. These user-defined functions may be input at the user device and saved in a database 110. In some non-limiting embodiments or aspects, for joining tables related to transactions processed in an electronic payment processing network, declined transactions may be skipped when joining authorization records and settlement records. This further increases the speed of the overall join.

In some non-limiting embodiments or aspects, when joining multiple tables of different size, a smaller table may be joined first, to prevent a slowdown caused by joining the smaller table after the combined table has already grown in size through previous joins. In some non-limiting embodiments or aspects, the ultimate output (e.g., a combined table) may be data-compressed to save computational resources when transmitting the results over a communication network 108.

In some non-limiting embodiments or aspects, a combined table may be stored in memory and, instead of being regenerated every time new data is received for one of the tables included therein, a delta table (e.g., a table of records indicative of new/changed data) may be appended to the combined table to capture changes to the underlying data. For example, the combined table may include a version field, and for each appended delta table, the version number field may be incremented for the records of the appended delta table. For records of the delta table that match with records of the combined table, a newer version number field may be referenced for manual or automatic renewal of an old record with an older version number. Alternatively or additionally, delta tables may be stored separately and updated separately from the combined table. When referencing the combined table, delta tables may be merged with the combined table in real-time. In this manner, the larger combined table need not be constantly updated, which reduces the computational resources for capturing changes to the underlying data.

With further reference to the foregoing figures, "electronic payment processing network" may refer to a plurality computing devices that transmit and/or receive communications between one or more entities for processing the transfer of monetary funds to one or more transactions. The electronic payment processing network may include a merchant system, an acquirer system, a transaction service provider system, and an issuer system.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect, and one or more steps may be taken in a different order than presented in the present disclosure.

What is claimed is:

1. A computer-implemented method comprising:
    loading, with at least one processor, a first table and a second table into at least one memory, the first table comprising a set of first time-series records and the second table comprising a set of second time-series records, each first time-series record of the set of first time-series records comprising a first plurality of attributes, and each second time-series record of the set of second time-series records comprising a second plurality of attributes, wherein a first attribute of the first plurality of attributes is of a target type and a second attribute of the second plurality of attributes is of the target type, and wherein the first plurality of attributes further comprises a respective first time stamp of each first time-series record and the second plurality of attributes further comprises a respective second time stamp of each second time-series record;
    replicating, with at least one processor, each first time-series record of the set of first time-series records to yield a plurality of identical records for said each first time-series record;
    generating, with at least one processor, a set of first key-value pairs based on the set of first time-series records of the first table and a set of second key-value pairs based on the set of second time-series records of the second table, wherein each first key-value pair of the set of first key-value pairs comprises, for each first time-series record, a first key based on the first attribute and a first value based on at least one first other attribute of the first plurality of attributes, and wherein each second key-value pair of the set of second key-value pairs comprises, for each second time-series record, a second key based on the second attribute and a second value based on at least one second other attribute of the second plurality of attributes;
    sorting, with at least one processor, the set of first key-value pairs based on the first key and the respective first time stamp of each first time-series record;
    sorting, with at least one processor, the set of second key-value pairs based on the second key and the respective second time stamp of each second time-series record;
    interleaving, with at least one processor, the set of first key-value pairs with the set of second key-value pairs based on the respective first time stamp of each first time-series record and the respective second time stamp of each second time-series record;
    sequentially matching, with at least one processor, each respective second time-series record with a respective first time-series record based on the second key, the respective second time stamp, the first key, and the respective first time stamp, to form a respective joined record in a joined table, wherein matching each respective second time-series record with the respective first time-series record further comprises:
        randomly matching said each respective second time-series record with one time-series record of the plurality of identical records for said each respective first time-series record; and
    in response to matching each respective second time-series record with the respective first time-series record, removing, with at least one processor, the respective second time-series record from the at least one memory.

2. The method of claim 1, wherein the matching of each respective second time-series record with a respective first time-series record is carried out on one of a plurality of server nodes, and wherein each node of the plurality of server nodes executes an independent mapper to match a different subset of first time-series records of the set of first time-series records in parallel with each other node of the plurality of server nodes.

3. The method of claim 2, wherein at least one of the first table and the second table is skewed, and wherein replicating each first time-series record of the set of first time-series records comprises:
  replicating, each first time-series record of the set of first time-series records a predetermined number of times to yield the plurality of identical records for said each first time-series record, thereby increasing a size of the set of first time-series records in proportion to the predetermined number.

4. The method of claim 3, wherein the predetermined number of times each first time-series record is replicated is at least ten.

5. The method of claim 3, wherein a number of the plurality of identical records is a same number as the plurality of server nodes, wherein each identical record of the plurality of identical records is sent to a different mapper of the plurality of server nodes, and wherein the randomly matching of said each respective second time-series record further comprises randomly selecting a mapper of the plurality of server nodes.

6. The method of claim 1, wherein the set of first time-series records comprises a plurality of transaction authorization records processed by a transaction processing system, and wherein the set of second time-series records comprises a plurality of transaction settlement records processed by the transaction processing system.

7. The method of claim 1, wherein the removing of each respective second time-series record from the at least one memory occurs in real-time immediately after said each respective second time-series record is matched with the respective first time-series record.

8. A system comprising at least one server comprising at least one processor, wherein the at least one server is programmed or configured to:
  load a first table and a second table into at least one memory, the first table comprising a set of first time-series records and the second table comprising a set of second time-series records, each first time-series record of the set of first time-series records comprising a first plurality of attributes, and each second time-series record of the set of second time-series records comprising a second plurality of attributes, wherein a first attribute of the first plurality of attributes is of a target type and a second attribute of the second plurality of attributes is of the target type, and wherein the first plurality of attributes further comprises a respective first time stamp of each first time-series record and the second plurality of attributes further comprises a respective second time stamp of each second time-series record;
  replicate each first time-series record of the set of first time-series records to yield a plurality of identical records for said each first time-series record;
  generate a set of first key-value pairs based on the set of first time-series records of the first table and a set of second key-value pairs based on the set of second time-series records of the second table, wherein each first key-value pair of the set of first key-value pairs comprises, for each first time-series record, a first key based on the first attribute and a first value based on at least one first other attribute of the first plurality of attributes, and wherein each second key-value pair of the set of second key-value pairs comprises, for each second time-series record, a second key based on the second attribute and a second value based on at least one second other attribute of the second plurality of attributes;
  sort the set of first key-value pairs based on the first key and the respective first time stamp of each first time-series record;
  sort the set of second key-value pairs based on the second key and the respective second time stamp of each second time-series record;
  interleave the set of first key-value pairs with the set of second key-value pairs based on the respective first time stamp of each first time-series record and the respective second time stamp of each second time-series record;
  sequentially match each respective second time-series record with a respective first time-series record based on the second key, the respective second time stamp, the first key, and the respective first time stamp, to form a respective joined record in a joined table, wherein, while matching each respective second time-series record with the respective first time-series record, the at least one server is programmed or configured to:
    randomly match said each respective second time-series record with one time-series record of the plurality of identical records for said each respective first time-series record; and
  in response to matching each respective second time-series record with the respective first time-series record, remove the respective second time-series record from the at least one memory.

9. The system of claim 8, wherein the at least one server comprises a plurality of server nodes, wherein matching each respective second time-series record with a respective first time-series record is carried out on one of the plurality of server nodes, and wherein each node of the plurality of server nodes executes an independent mapper to match a different subset of first time-series records of the set of first time-series records in parallel with each other node of the plurality of server nodes.

10. The system of claim 9, wherein at least one of the first table and the second table is skewed, and wherein, while replicating each first time-series record of the set of first time-series records, the at least one server is further programmed or configured to:
  replicate each first time-series record of the set of first time-series records a predetermined number of times to yield the plurality of identical records for said each first time-series record, thereby increasing a size of the set of first time-series records in proportion to the predetermined number.

11. The system of claim 10, wherein the predetermined number of times each first time-series record is replicated is at least ten.

12. The system of claim 10, wherein a number of the plurality of identical records is a same number as the plurality of server nodes, wherein each identical record of the plurality of identical records is sent to a different mapper of the plurality of server nodes, and wherein the randomly matching of said each respective second time-series record further comprises randomly selecting a mapper of the plurality of server nodes.

13. The system of claim 8, wherein the at least one server is part of a transaction processing system, wherein the set of first time-series records comprises a plurality of transaction authorization records processed by the transaction processing system, and wherein the set of second time-series records comprises a plurality of transaction settlement records processed by the transaction processing system.

14. The system of claim 8, wherein removing each respective second time-series record from the at least one memory occurs in real-time immediately after said each respective second time-series record is matched with the respective first time-series record.

15. A computer program product comprising at least one non-transitory computer-readable medium including program instructions that, when executed by at least one processor, cause the at least one processor to:
load a first table and a second table into at least one memory, the first table comprising a set of first time-series records and the second table comprising a set of second time-series records, each first time-series record of the set of first time-series records comprising a first plurality of attributes, and each second time-series record of the set of second time-series records comprising a second plurality of attributes, wherein a first attribute of the first plurality of attributes is of a target type and a second attribute of the second plurality of attributes is of the target type, and wherein the first plurality of attributes further comprises a respective first time stamp of each first time-series record and the second plurality of attributes further comprises a respective second time stamp of each second time-series record;
replicate each first time-series record of the set of first time-series records to yield a plurality of identical records for said each first time-series record;
generate a set of first key-value pairs based on the set of first time-series records of the first table and a set of second key-value pairs based on the set of second time-series records of the second table, wherein each first key-value pair of the set of first key-value pairs comprises, for each first time-series record, a first key based on the first attribute and a first value based on at least one first other attribute of the first plurality of attributes, and wherein each second key-value pair of the set of second key-value pairs comprises, for each second time-series record, a second key based on the second attribute and a second value based on at least one second other attribute of the second plurality of attributes;
sort the set of first key-value pairs based on the first key and the respective first time stamp of each first time-series record;
sort the set of second key-value pairs based on the second key and the respective second time stamp of each second time-series record;
interleave the set of first key-value pairs with the set of second key-value pairs based on the respective first time stamp of each first time-series record and the respective second time stamp of each second time-series record;
sequentially match each respective second time-series record with a respective first time-series record based on the second key, the respective second time stamp, the first key, and the respective first time stamp, to form a respective joined record in a joined table, wherein the program instructions that cause the at least one processor to match each respective second time-series record with the respective first time-series record cause the at least one processor to:
randomly match said each respective second time-series record with one time-series record of the plurality of identical records for said each respective first time-series record; and
in response to matching each respective second time-series record with the respective first time-series record, remove the respective second time-series record from the at least one memory.

16. The computer program product of claim 15, wherein the at least one processor comprises a plurality of server nodes, wherein matching each respective second time-series record with a respective first time-series record is carried out on one of the plurality of server nodes, and wherein each node of the plurality of server nodes executes an independent mapper to match a different subset of first time-series records of the set of first time-series records in parallel with each other node of the plurality of server nodes.

17. The computer program product of claim 16, wherein at least one of the first table and the second table is skewed, and wherein the program instructions that cause the at least one processor to replicate each first time-series record of the set of first time-series records further cause the at least one processor to:
replicate each first time-series record of the set of first time-series records a predetermined number of times to yield the plurality of identical records for said each first time-series record, thereby increasing a size of the set of first time-series records in proportion to the predetermined number.

18. The computer program product of claim 17, wherein the predetermined number of times each first time-series record is replicated is at least ten.

19. The computer program product of claim 17, wherein a number of the plurality of identical records is a same number as the plurality of server nodes, wherein each identical record of the plurality of identical records is sent to a different mapper of the plurality of server nodes, and wherein the randomly matching of said each respective second time-series record further comprises randomly selecting a mapper of the plurality of server nodes.

20. The computer program product of claim 15, wherein removing each respective second time-series record from the at least one memory occurs in real-time immediately after said each respective second time-series record is matched with the respective first time-series record.

* * * * *